United States Patent [19]

Zhang et al.

[11] Patent Number: 5,645,958
[45] Date of Patent: Jul. 8, 1997

[54] SUPERABSORBENT POLYMER ELECTROLYTES FOR ELECTROCHEMICAL CELLS AND ELECTROCHEMICAL CELLS USING SAME

[75] Inventors: Jinshan Zhang, Coral Springs; Ganesh Venugopal, Plantation, both of Fla.

[73] Assignee: Motorola, Inc., Schaumburg, Ill.

[21] Appl. No.: 251,066

[22] Filed: May 31, 1994

[51] Int. Cl.$^6$ .................................................. H01M 6/18
[52] U.S. Cl. ................................................................ 429/192
[58] Field of Search ................................. 429/192, 213, 429/249, 254

[56] References Cited

U.S. PATENT DOCUMENTS

| | | | |
|---|---|---|---|
| 4,814,242 | 3/1989 | Maxfield et al. | 429/217 |
| 4,987,157 | 1/1991 | Smart et al. | 521/50 |
| 5,075,399 | 12/1991 | Ahmed et al. | 526/287 |
| 5,098,970 | 3/1992 | Hsieh et al. | 526/287 |
| 5,106,929 | 4/1992 | Ahmed et al. | 526/240 |
| 5,130,389 | 7/1992 | Ahmed et al. | 526/240 |
| 5,130,391 | 7/1992 | Ahmed et al. | 526/288 |
| 5,196,278 | 3/1993 | Idota | 429/194 |
| 5,252,690 | 10/1993 | Ahmed et al. | 526/258 |

*Primary Examiner*—Kathryn Gorgos
*Attorney, Agent, or Firm*—Kenneth M. Massaroni

[57] ABSTRACT

An electrolyte system 40 for use in connection with an electrochemical cell (10). The cell (10) includes a positive (20) and a negative (30) electrode, and the electrolyte system (40) disposed there between. The electrolyte system includes a liquid electrolyte adapted to provide ion transport between the positive and negative electrodes and a polymeric support structure for engaging the liquid electrolyte.

35 Claims, 4 Drawing Sheets

5,645,958

SUPERABSORBENT POLYMER ELECTROLYTES FOR ELECTROCHEMICAL CELLS AND ELECTROCHEMICAL CELLS USING SAME

TECHNICAL FIELD

This invention relates in general to the field of electrolytes for electrochemical cells, and more particularly to polymer electrolytes for such cells.

BACKGROUND

There has been a great deal of interest in developing better and more efficient methods for storing energy for applications such as radio communication, satellites, portable computers, and electric vehicles to name but a few. Accordingly, there have been recent concerted efforts to develop high energy, cost effective batteries having improved performance characteristics.

Rechargeable, or secondary cells are more desirable than primary (non-rechargeable) cells since the associated chemical reactions which take place at the positive and negative electrodes of the battery are reversible. Electrodes for secondary cells are capable of being regenerated (i.e. recharged) many times by the application of an electrical charge thereto. Numerous advanced electrode systems have been developed for storing electrical charge. Concurrently, much effort has been dedicated to the development of electrolytes capable of enhancing the capabilities of electrochemical cells.

Heretofore, electrolytes have been either liquid electrolytes as are found in conventional wet cell batteries, or solid films as are available in newer, more advanced battery systems. Each of these systems have inherent limitations, and related deficiencies which make them unsuitable for various applications.

Liquid electrolytes, while demonstrating acceptable ionic conductivity, tend to leak out of the cells into which they are sealed. While better manufacturing techniques have lessened the occurrence of leakage, cells still do leak potentially dangerous liquid electrolytes from time to time. This is particularly true of current lithium ion cells. Moreover, any leakage in the cell lessens the amount of electrolyte available in the cell, thus reducing the effectiveness of the cell. Cells using liquid electrolytes are also not available for all sizes and shapes of batteries.

Conversely, solid electrolytes are free from problems of leakage. However, they have vastly inferior properties as compared to liquid electrolytes. For example, conventional solid electrolytes have ionic conductivities in the range of $10^{-5}$ S/cm. Whereas acceptable ionic conductivity is $>10^{-3}$ S/cm. Good ionic conductivity is necessary to ensure a battery system capable of delivering usable amounts of power for a given application. Good conductivity is necessary for the high rate operation demanded by, for example, cellular telephones and satellites. Accordingly, solid electrolytes are not adequate for many high performance battery systems.

One solution which has been proposed relates to the use of so-called gel electrolytes for electrochemical systems. These types of electrolytes have not been entirely successful as they tend to dissolve in the electrolyte solvent, thus losing mechanical integrity.

Accordingly, there exists a need for a new electrolyte system which combines the mechanical stability and freedom from leakage offered by solid electrolytes with the high ionic conductivities of liquid electrolytes.

SUMMARY OF THE INVENTION

Briefly, according to the invention, there is provided an electrolyte system for use in an electrochemical cell having positive and negative electrodes. The electrolyte system includes an electrochemically active material or species, such as a liquid electrolyte, adapted to promote ion transport between the positive and negative electrodes. The electrolyte system further includes an organic support structure fabricated of a polymeric material. The polymeric material is adapted to engage, as by absorption, in excess of 200 weight % of the electrochemically active material.

Further, according to an alternate embodiment of the invention, there is provided an electrochemical cell including a positive and negative electrode and an electrolyte system. The electrolyte system comprises an electrochemically active material or species, such as a liquid electrolyte, and a superabsorbent organic support structure for absorbing said electrochemically active species.

DETAILED DESCRIPTION OF THE PREFERRED EMBODIMENT

Figure 1:
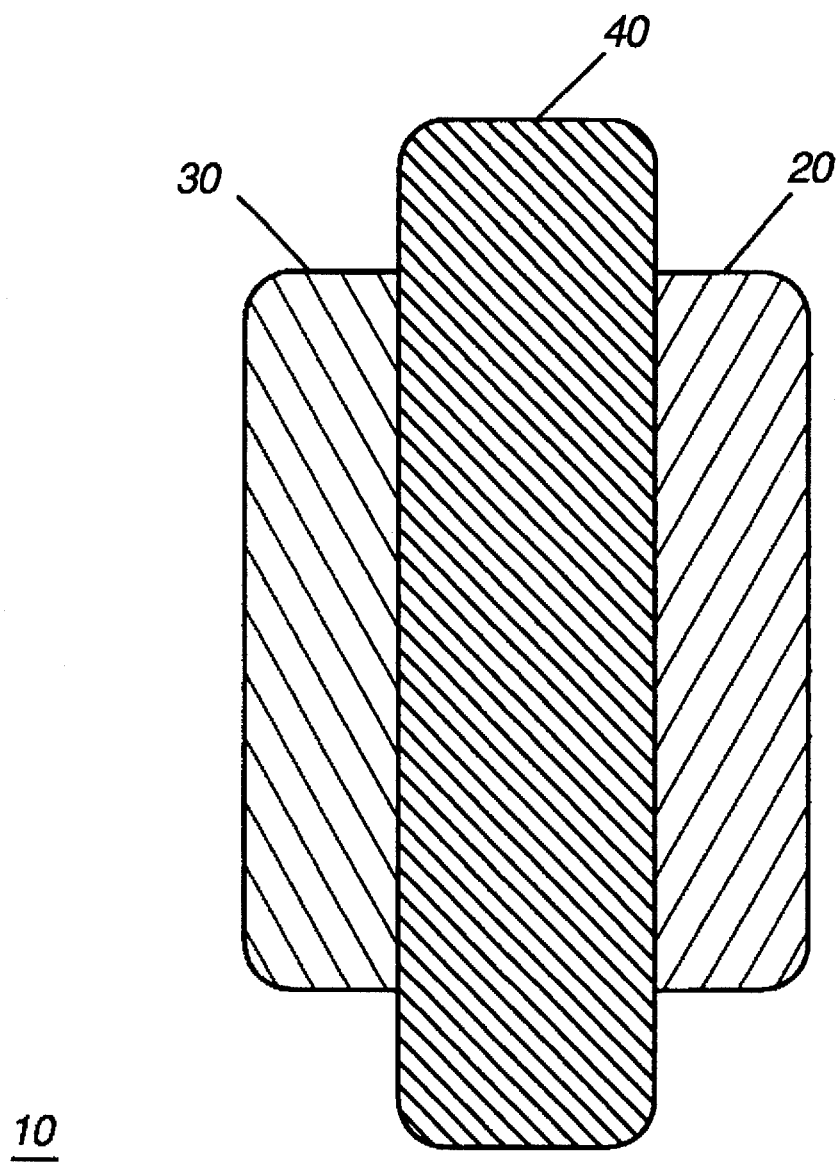
FIG. 1 is a schematic representative of an electrochemical cell in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell in accordance with the instant invention. The cell 10 includes a positive electrode 20 and a negative electrode 30. The positive electrode 20 may be fabricated of any of a number of chemical systems known to those of ordinary skill in the art. Examples of such systems include manganese oxide, nickel oxide, cobalt oxide, vanadium oxide, and combinations thereof. The negative electrode 30 may likewise be fabricated from any of a number of electrode materials known to those of ordinary skill in the art. Selection of the negative electrode material is dependent on the selection of the positive electrode so as to assure an electrochemical cell which will function properly for a given application. In this context, the negative electrode may be fabricated from alkali metals, alkali metal alloys, carbon, graphite, petroleum coke, and combinations thereof.

Operatively, disposed between the positive 20 and negative 30 electrodes is an electrolyte system 40. The electrolyte system 40 comprises an organic polymeric support structure adapted to engage, as for example, by absorption, in excess 200 wt % and up to or in excess of 500 wt % of an electrochemically active species or material. The electrochemically active material may be a liquid electrolyte adapted to promote ion transport between said positive 20 and negative 30 electrodes.

The liquid electrolyte absorbed by the organic support structure is selected to optimize performance of the positive 20 and negative 30 electrode couple. The liquid electrolyte absorbed by the organic support structure is, therefore, typically a solution of an alkali metal salt, or combination of salts, dissolved in a non-protonic organic solvent or solvents. Typical alkali metal salts include, but are not limited to, salts having the formula $M^+X^-$ where $M^+$ is a alkali metal cation such as $Li^+$, $Na^+$, $K^+$ and combinations thereof; and $X^-$ is an anion such as $Cl^-$, $Br^-$, $I^-$, $ClO_4^-$, $BF_4^-$, $PF_5^-$, $AsF_6^-$, $SbF_6^-$, $CH_3CO_2^-$, $CF_3SO_3^-$, $(CF_3O_2)_2N^-$ $(CF_3SO_2)_2N^-$, $(CF_3SO_2)_3C^-$, and combinations thereof. Non-protonic organic solvents include, but are not limited to, propylene carbonate, ethylene carbonate, diethyl carbonate, dimethyl carbonate, dipropyl carbonate, dimethyl sulfoxide, acetonitrile, dimethoxyethane, diethoxyethane, tetrahydrofuran, and combinations thereof.

The organic polymeric support structure may be fabricated of a superabsorbent polymer. By superabsorbent polymer, it is meant to refer to certain highly cross-linked polymers which absorb liquid electrolyte in excess of 200 wt %, and preferably in excess of 300 wt %. Most preferably, the superabsorbent polymer would absorb liquid electrolyte in excess of 500 wt %. It is essential that, upon absorption of the liquid electrolyte, the superabsorbent polymer still appears and behaves like a solid. Accordingly, the material cannot flow, nor can it appear wet or damp. Further, the superabsorbent polymer support structure must not leak or demonstrate a potential for liquid leakage, nor may it release absorbed liquid electrolyte even under high external pressure, as may occur during manufacturing. Characteristics of superabsorbent polymers include, but are not necessarily limited to, high surface areas (i.e., in excess of 100 m²/g) and high porosities (i.e., in excess of 20%). Examples of superabsorbent polymers include, but are not limited to, those derived from styrene and divinylbenzene, as well as from methyl (acrylates) and polyfunctional methylacrylates.

In the instant invention, it is contemplated that the superabsorbent polymer used in the electrolyte system 40 is a crosslinked polymer network having certain repeating units. Repeating units are the discrete sections of the polymer which are repeated numerous times to create the overall polymer molecule. Specific repeating units may be selected from the group consisting of 4,4-phenylene, 4,4'-biphenylene, 4,4"-p-terphenylene, 1,3,5-phenylene, and combinations thereof. In one preferred embodiment, the superabsorbent polymer of the electrolyte system 40 is a 1,4-biphenylene polymeric network comprising tris(4,4'-biphenylene) carbinol repeating units, which appear below and are referred to hereinafter as the "4,4'-biphenylene polymer".

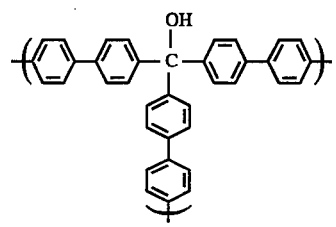

The polymeric network is made from 4,4'-dilithiobiphenyl with dimethyl carbonate as the crosslinking agent. Methods for the fabrication of these types of polymers are disclosed in, for example, U.S. Pat. No. 4,987,157, to Smart, et al. Specifically commercially available, 4,4'dibromobiphenyl is treated with t-butyl lithium, yielding 4,4'-dilithiobiphenyl. This is then cross-linked with dimethyl carbonate.

In addition to the electrochemically active species in the polymeric support structure, the electrolyte system 40 may further include a material such as a binder material adapted to enhance the mechanical integrity of the electrolyte system. This binder material may be specifically adapted to enable the electrolyte system to be pressed into thin films to be disposed between said positive 20 and negative 30 electrodes. The binder material may be selected from the group of materials consisting of poly(ethylene oxide), poly (isobutylene), poly(butyldiene), poly(vinyl alcohol), poly (ethylene), poly(propylene), poly(vinyldene fluoride), poly (acrylonitrile), poly(dimethylsiloxane), ethylene-propylene-diene-monomer, rubber, acrylonitrile-butyldiene rubber, cross-linkable systems like tetra(ethylene glycol) diacrylate, and combinations thereof. In one preferred embodiment, the binder material is poly (ethylene oxide) or poly (isobutylene). The ratio of the binder material to the superabsorbent polymer is between 5 wt % to 300 wt %, and preferably from 50 wt % to 100 wt %.

The following examples are intended to illustrate the advantages of the instant invention, and are not intended to be limitations thereof.

EXAMPLE 1

The electrolyte system described hereinabove was fabricated by providing a superabsorbent polymer consisting of approximately 0.3 grams of 4,4'-biphenylene polymer into a mortar. To the 4,4'-biphenylene polymer, there was added an electrochemically active material consisting of an alkali metal salt and a non-protonic organic solvent. In this case, the salt was $LiClO_4$, in propylene carbonate was solvent. Specifically, 1.5 g of 1M $LiClO_4$ in propylene carbonate was added to the 0.3 g of 4,4'-biphenylene polymer. The mixture was ground in the mortar until a fine powder was obtained. The powder was then pressed into a film having a thickness of approximately 0.06 cm and an area of 0.483 cm².

Figure 2:
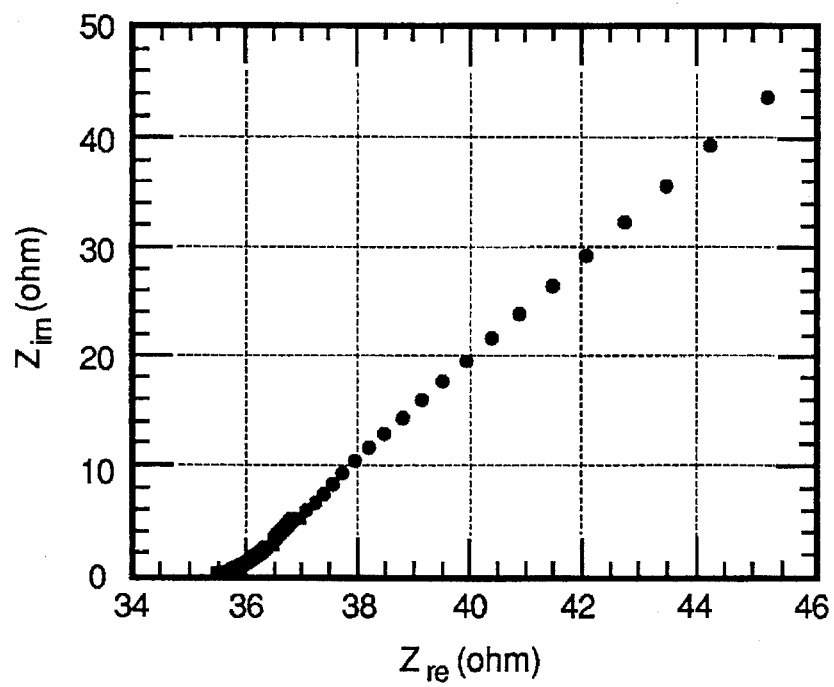
FIG. 2 is an AC impedance spectrum of an electrolyte system in accordance with the instant invention.

Referring now to FIG. 2, there is illustrated therein the AC impedance spectrum (at room temperature) for the electrolyte system described in this Example 1. The AC frequency range is from 1 kHz to 100 kHz and the measurements yield a conductivity of approximately $3.5 \times 10^{-3}$ S/cm (wherein S is a unit of conductance) This electrolyte system offers high ionic conductivity comparable to that found in most liquid electrolytes, and yet offers an electrolyte having solid-like properties.

EXAMPLE 2

An electrolyte system as described hereinabove was fabricated by providing a superabsorbent polymer consisting of approximately 3.0 grams of 4,4'-biphenylene polymer into a mortar. To the 4,4'-biphenylene polymer, there was added an electrochemically active material consisting of an alkali salt and a non-protonic organic solvent. In this case, the salt was LiBF$_4$, in propylene carbonate as solvent. Specifically, 1.5 g of 1M LiBF$_4$ in propylene carbonate was added to the 0.3 g of 4,4'-biphenylene. The mixture was ground in the mortar until a fine powder was obtained. The powder was pressed into a film having a thickness of approximately 0.06 cm and an area of 0.48 cm$^2$.

Figure 3:
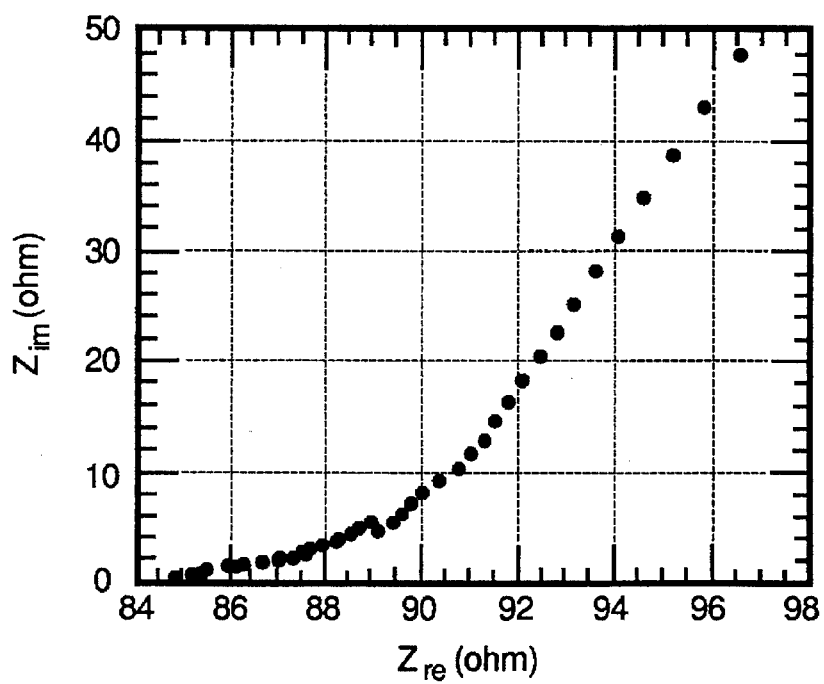
FIG. 3 is an AC impedance spectrum for an alternate embodiment of an electrolyte system in accordance with instant invention.

Referring now to FIG. 3, there is illustrated therein an AC impedance spectrum for the electrolyte system according to this Example 2. Using an AC impedance spectrum at room temperature, it was determined that the conductivity of the electrolyte system is 1.5×10$^{-3}$ S/cm.

EXAMPLE 3

And amount of 0.15 g of 4,4'-biphenylene polymer was provided in a mortar to which was added 0.8 g of 1M LiBF$_4$ in propylene carbonate. The mixture was thoroughly ground until a fine powder was obtained. Thereafter, 0.05 g of poly(ethylene oxide) binder material was added to the powder mixture in the mortar and the mixture was again ground. A high tack, high stick material was obtained. The thickness of the material was approximately 0.06 m, and the area of the material was approximately 0.483 cm$^2$.

Figure 4:
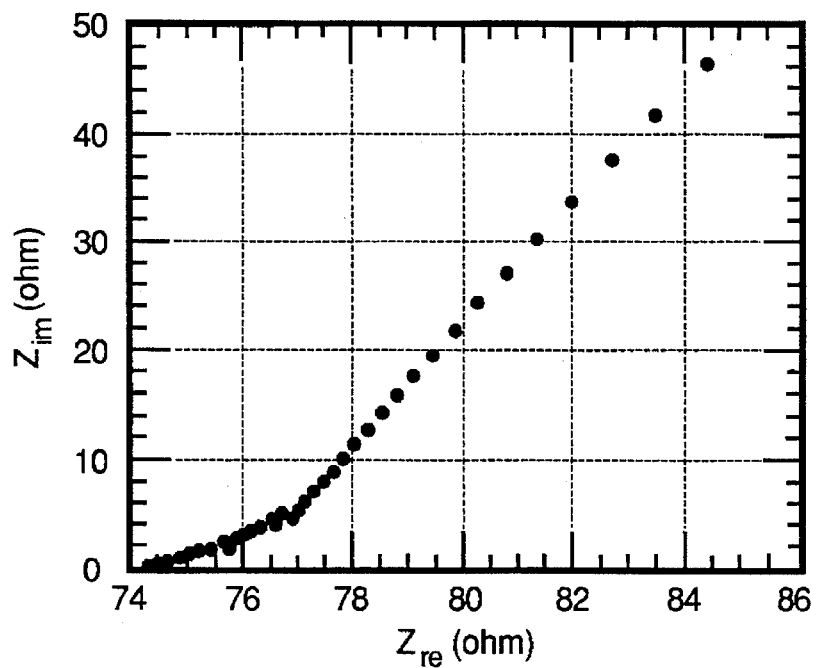
FIG. 4 is an AC impedance spectrum for another alternate embodiment of an electrolyte system in accordance with the instant invention.

Referring now to FIG. 4, there is illustrated therein an AC impedance spectrum for the sample prepared according to this Example 3. The material prepared accordingly to this Example 3, demonstrated a conductivity of 1.6×10$^{-3}$ S/cm.

EXAMPLE 4

Figure 5:
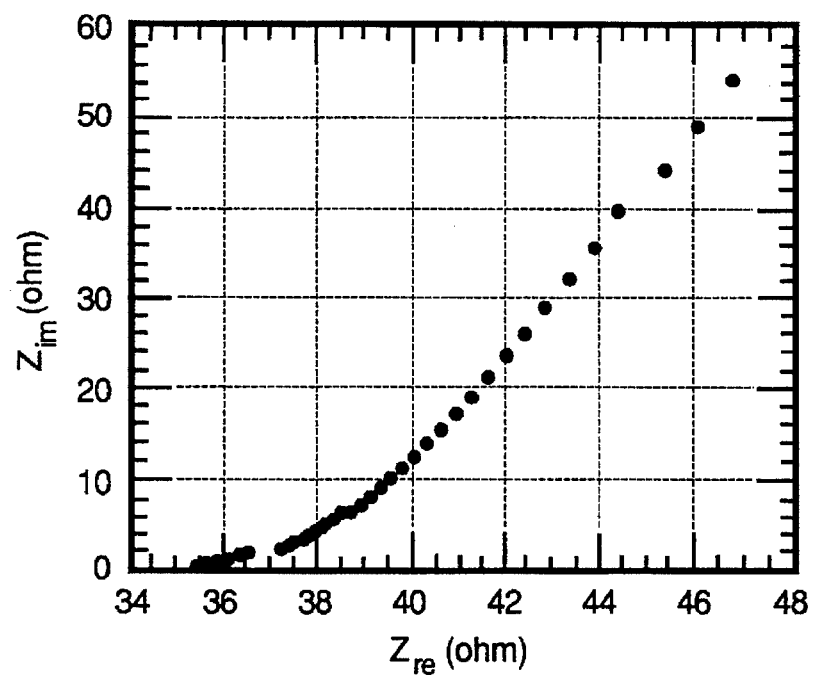
FIG. 5 is an AC impedance spectrum for another alternate embodiment of an electrolyte system in accordance with the instant invention.

And amount of 0.15 g. of 4,4'-biphenylene polymer was provided in a mortar to which was added a solution of 0.80 g of 1M LiBF$_4$ in propylene carbonate. The mixture was thoroughly ground and mixed until a fine powder was obtained. Thereafter, 1.5 g of poly(isobutylene) solution in hexane (0.1 g of poly(isobutylene) and in 1 g of solution) was added to the powder and the mixture was again thoroughly ground. The resulting, well-mixed paste was then set out so as to provide for evaporation of the hexane. As the hexane evaporated, the paste developed a high-tack, high-stick consistency. Thereafter, the paste was pressed at pressure of 10,000 lbs. and a rubbery thin film material was produced. A sample was prepared from the film, that a thickness of 0.0278 cm, and an area of 1.0 cm$^2$. Using an AC impedance spectrum at room temperature, a thin film having a conductivity of 7.1×10$^{-4}$ S/cm was provided. These results are illustrated in FIG. 5.

EXAMPLE 5

And amount of 1.5 g of 4,4'- biphenylene polymer was provided in a mortar to which was added 3.0 g of 1M LiBF$_4$ in propylene carbonate. The mixture was thoroughly ground and a fine powder was obtained. Thereafter, 15 g of poly (isobutylene) solution in hexane (0.1 g of poly(isobutylene) in 1 g of solution) was added to the powder and again thoroughly ground. The resulting well-mixed material was then set out so as that the hexane could be evaporated. As the hexane evaporated, the paste developed a high-tack, high stick consistency. The paste was then pressed under pressure of 10,000 lbs. per square inch yielding a rubbery thin film with a thickness of between 200 and 300 microns. A sample was selected from this material having a thickness of 0.0278 cm. The area of the sample was 1 cm2. The sample was then tested by AC impedance spectrum (at room temperature).

Figure 6:
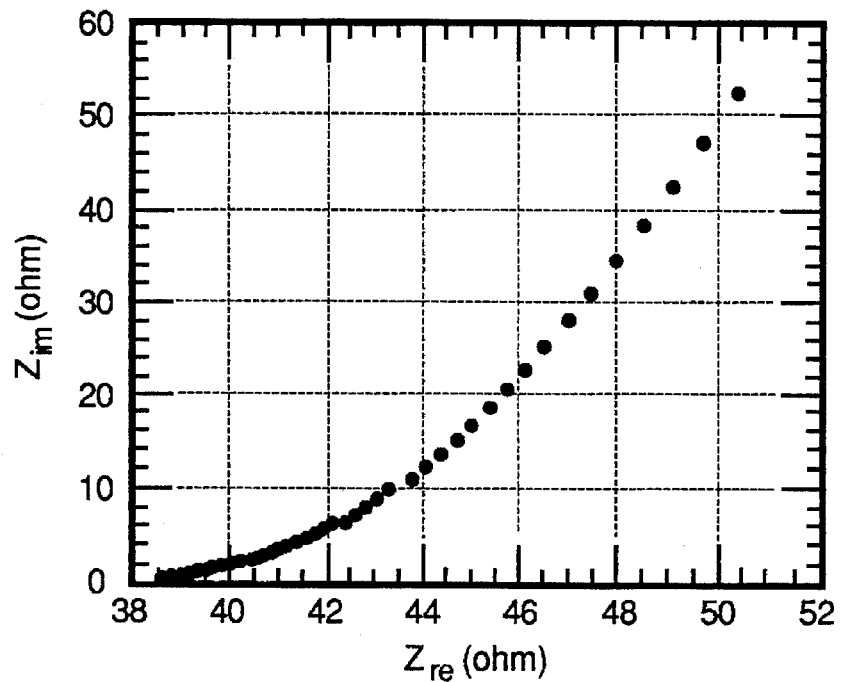
FIG. 6 is an AC impedance spectrum for an alternate embodiment of an electrolyte system in accordance with the instant invention.
Figure 7:
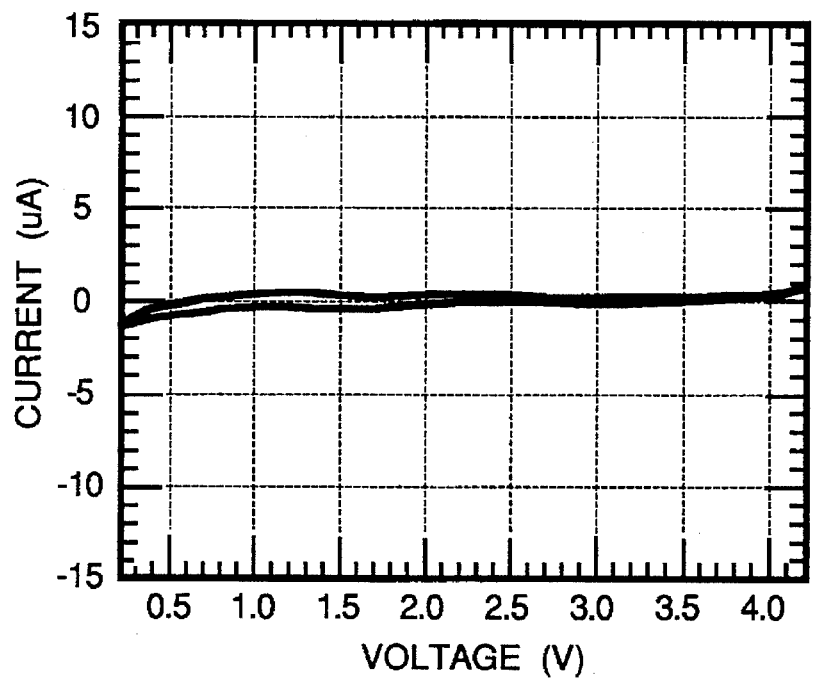
FIG. 7 is a cyclic voltammagram for an electrolyte system in accordance with the instant invention.

Referring now to FIG. 6, there is illustrated therein the AC impedance spectrum for the sample. The AC frequency ranges from 1 hz to 100 hz. Using this measurement, the conductivity of the sample was found to be approximately 6.6×10$^{-4}$ S/cm. Thereafter, a cyclic voltammagram of the electrolyte system was run on said sample. The scan rate of the cyclic voltammagram was 0.5 mV/s. Platinum mesh was used for both electrodes and lithium as the reference electrode. The result of the cyclic voltammagram is illustrated in FIG. 7. As maybe appreciated from the perusal of the cyclic voltammagram, the stability of the electrolytes solution described in Example 5 is quite good in the voltage range of 0.2 to 4.2 volts. No peaks were observed, demonstrating high stability of the electrolyte system.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrolyte system for use in an electrochemical cell having positive and negative electrodes, said system comprising:

an electrochemically active material which promotes ion transport between said positive and said negative electrodes; and an organic support structure fabricated of a superabsorbent polymer material, said support structure holding in excess of 200 weight percent of said electrochemically active material wherein the superabsorbent polymer is of a crosslinked biphenyl-based polymer.

2. An electrolyte system as in claim 1, wherein said electrochemically active material is a liquid electrolyte, and said support structure absorbs said electrolyte.

3. An electrolyte system as in claim 2, wherein said liquid electrolyte is an alkali metal salt dissolved in a non-protonic organic solvent.

4. An electrolyte system as in claim 3, wherein said alkali metal salt is selected from the group consisting of materials having the formula M$^+$X$^-$ where:

M$^+$ is an alkali metal cation selected from the group consisting of Li$^+$, Na$^+$, and K$^+$, and X$^-$ is an anion selected from the group consisting of Cl$^-$, Br$^-$, I$^-$, ClO$_4^-$, BF$_4^-$, PF$_5^-$, AsF$_6^-$, SbF$_6^-$, CH$_3$CO$_2^-$, CF$_3$SO$_3^-$, (CF$_3$SO$_2$)$_2$N$_2^-$, (CF$_3$SO$_2$)$_3$C$^-$, and combinations thereof.

5. An electrolyte system as in claim 3, wherein said nonprotonic organic solvent is selected from the group consisting of propylene carbonate, ethylene carbonate, diethyl carbonate, dimethyl carbonate, dipropyl carbonate, dimethyl sulfoxide, acetonitrile, dimethoxyethane, diethoxyethane, tetrahydrofuran, and combinations thereof.

6. An electrolyte system as in claim 3, wherein said electrochemically active material is LiClO$_4$ in propylene carbonate.

7. An electrolyte system as in claim 1, further including a binder material.

8. An electrolyte system as in claim 7, wherein said binder material is selected from the group consisting of poly (ethylene oxide), poly(isobutylene), poly(butyldiene), poly (vinyl alcohol), poly(ethylene), poly(propylene), poly (vinylidene fluoride), poly(dimethylsiloxene), poly (acrylonitrile), ethylene-propylene-diene-monomer, acrylonytrile-butyldiene, rubber tetra(ethylene glycol) diacrylate and combinations thereof.

9. An electrolyte system as in claim 8, wherein said binder material is poly(ethylene oxide).

10. An electrolyte system as in claim 11, wherein said binder material is poly(isobutylene).

11. An electrolyte system as in claim 1, wherein said superabsorbent polymer support structure is fabricated of a material having repeating units selected from the group consisting of 1,4-phenylene, 4,4'-biphenylene, 4,4"-p-terphenylene, 1,3,5-phenylene, and combinations thereof.

12. An electrolyte system as in claim 11, wherein said superabsorbent polymer support structure is fabricated from 4,4'-biphenylene polymeric network comprising tris(4,4'-biphenylene) carbinol repeating units.

13. An electrolyte system for use in an electrochemical cell, said system including an electrochemically active material, and a superabsorbent support structure characterized by ionic conductivity in excess of $3.0 \times 10^{-3}$ S/cm, surface areas in excess of 100 m$^2$/g, and porosity in excess of 20% wherein the superabsorbent polymer is of a crosslinked biphenyl-based polymer.

14. An electrolyte system as in claim 13, wherein said electrochemically active material is a liquid electrolyte, and said support structure absorbs said electrolyte.

15. An electrolyte system as in claim 14, wherein said liquid electrolyte is an alkali metal salt dissolved in a non-protonic organic solvent.

16. An electrolyte system as in claim 15, wherein said alkali metal salt is selected from the group consisting of materials having the formula M+X− where:

$M^+$ is an alkali metal cation selected from the group consisting of Li$^+$, Na$^+$, K$^+$, and $X^-$ is an anion selected from the group consisting of Cl$^-$, Br$^-$, I$^-$, ClO$_4^-$, BF$_4^-$, PF$_5^-$, AsF$_6^-$, SbF$_6^-$, CH$_3$CO$_2^-$, CF$_3$SO$_3^-$, (CF$_3$SO$_2$)$_2$N$_2^-$, (CF$_3$SO$_2$)$_3$C$^-$, and combinations thereof.

17. An electrolyte system as in claim 15, wherein said nonprotonic organic solvents are selected from the group consisting of propylene carbonate, ethylene carbonate, diethyl carbonate, dimethyl carbonate, dipropyl carbonate, dimethyl sulfoxide, acetonitrile, dimethoxyethane, diethoxyethane, tetrahydrofuran, and combinations thereof.

18. An electrolyte system as in claim 15, wherein said electrochemically active material is LiClO$_4$ in propylene carbonate.

19. An electrolyte system as in claim 13, further including a binder material.

20. An electrolyte system as in claim 19, wherein said binder material is selected from the group consisting of poly(ethylene oxide), poly(isobutylene), poly(butyldiene), poly(vinyl alcohol), poly(ethylene), poly(propylene), poly (vinylidene fluoride), poly(dimethylsiloxene), poly (acrylonitrile, ethylene-propylene-diene-monomer, acrylonytrilebutyldiene rubber, tetra(ethylene glycol) diacrylate and combinations thereof.

21. An electrolyte system as in claim 20, wherein said binder material is poly(ethylene oxide).

22. An electrolyte system as in claim 20, wherein said binder material is poly(isobutylene).

23. An electrolyte system as in claim 13, wherein said superabsorbent support structure is fabricated of a material having repeating units selected from the group consisting of 1,4-phenylene, 4,4'-biphenylene, 4,4"-p-terphenylene, 1,3,5-phenylene, and combinations thereof.

24. An electrolyte system as in claim 23, wherein said support structure is fabricated from a crosslinked 4,4'-biphenylene polymer network comprising tris(4,4'-biphenylene) carbinol repeating units.

25. An electrochemical cell comprising:

a positive electrode;

a negative electrode; and an electrolyte system comprising a liquid electrolyte absorbed into a superabsorbent polymer support structure.

26. An electrochemical cell as in claim 25, wherein said electrolyte system further includes a binder material.

27. An electrolyte system as in claim 26, wherein said binder material is selected from the group consisting of poly(ethylene oxide), poly(isobutylene), poly(butyldiene), poly(vinyl alcohol), poly(ethylene), poly(propylene), poly (vinylidene fluoride), poly(dimethylsiloxene), poly (acrylonitrile) ethylene-propylene-diene-monomer, acrylonytrile-butyldiene rubber, tetra(ethylene glycol) diacrylate and combinations thereof.

28. An electrochemical cell as in claim 27, wherein said binder material is poly(ethylene oxide).

29. An electrochemical cell as in claim 27 wherein said binder material is poly(isobutylene).

30. An electrochemical cell as in claim 25, wherein said support structure is fabricated of a material having repeating units selected from the group consisting of 1,4-phenylene, 4,4'-biphenylene, 4,4"-p-terphenylene, 1,3,5-phenylene, and combinations thereof.

31. An electrochemical cell as in claim 30, wherein said support structure is fabricated from a crosslinked 4,4'-biphenylene polymer network comprising tris (4,4'-biphenylene) carbinol repeating units.

32. An electrochemical cell as in claim 25, wherein said liquid electrolyte is an alkali metal salt dissolved in a non-protonic organic solvent.

33. An electrolyte system as in claim 32, wherein said alkali metal salt is selected from the group consisting of materials having the formula M$^+$X$^-$ where:

$M^+$ is an alkali metal cation selected from the group consisting of Li$^+$, and Na$^+$, K$^+$, and X− is an anion selected from the group consisting of Cl$^-$, Br$^-$, I$^-$, ClO$_4^-$, BF$_4^-$, PF$_5^-$, AsF$_6^-$, SbF$_6^-$, CH$_3$CO$_2^-$, CF$_3$SO$_3^-$, (CF$_3$SO$_2$)$_2$N$_2^-$, (CF$_3$SO$_2$)$_3$C$^-$, and combinations thereof.

34. An electrochemical cell as in claim 32, wherein said nonprotonic organic solvents are selected from the group consisting of propylene carbonate, ethylene carbonate, diethyl carbonate, dimethyl carbonate, dipropyl carbonate, dimethyl sulfoxide, acetonitrile, dimethoxyethane, diethoxyethane, tetrahydrofuran, and combinations thereof.

35. An electrochemical cell as in claim 32, wherein said electrochemically active material is LiClO$_4$ in propylene carbonate.

* * * * *